United States Patent
Lindoff et al.

(10) Patent No.: US 10,356,699 B2
(45) Date of Patent: Jul. 16, 2019

(54) CELL SEARCH IN CLUSTERS

(71) Applicant: Telefonaktiebolaget LM Ericsson (publ), Stockholm (SE)

(72) Inventors: Bengt Lindoff, Bjarred (SE); Johan Nilsson, Hollviken (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 243 days.

(21) Appl. No.: 14/915,244

(22) PCT Filed: Sep. 18, 2013

(86) PCT No.: PCT/EP2013/069340
§ 371 (c)(1),
(2) Date: Feb. 28, 2016

(87) PCT Pub. No.: WO2015/039683
PCT Pub. Date: Mar. 26, 2015

(65) Prior Publication Data
US 2016/0219497 A1    Jul. 28, 2016

(51) Int. Cl.
*H04W 48/18* (2009.01)
*H04W 56/00* (2009.01)
*H04W 48/16* (2009.01)
*H04W 88/04* (2009.01)

(52) U.S. Cl.
CPC .......... *H04W 48/16* (2013.01); *H04W 56/00* (2013.01); *H04W 56/002* (2013.01); *H04W 88/04* (2013.01)

(58) Field of Classification Search
None
See application file for complete search history.

(56) References Cited

U.S. PATENT DOCUMENTS 9,629,050 B2    4/2017 Slomina et al.
2009/0034589 A1*  2/2009 Hahm ................ H04B 1/7075
375/150

(Continued)

FOREIGN PATENT DOCUMENTS

GB      2425233 A    10/2006
WO   2008035140 A1    3/2008

(Continued)

OTHER PUBLICATIONS

PCT International Search Report, dated May 26, 2014, in connection with International Application No. PCT/EP2013/069340, all pages.

(Continued)

*Primary Examiner* — Duc T Duong
(74) *Attorney, Agent, or Firm* — Leffler Intellectual Property Law, PLLC (57) ABSTRACT

There is provided mechanisms for cell search in a cluster based communications network. According to one aspect there is provided a method performed by a wireless device camping on or served by a cluster head device associated with a cluster head carrier frequency. According to one aspect there is provided a method performed by a cluster head device associated with a cluster head carrier frequency. A corresponding wireless device, a corresponding cluster head device, and corresponding computer programs and computer program products are also provided.

16 Claims, 4 Drawing Sheets

(56) References Cited

U.S. PATENT DOCUMENTS

| | | | |
|---|---|---|---|
| 2010/0029295 A1* | 2/2010 | Touboul | H04J 11/0093 |
| | | | 455/456.1 |
| 2010/0067507 A1* | 3/2010 | Park | H04W 56/00 |
| | | | 370/338 |
| 2010/0080195 A1 | 4/2010 | Hara et al. | |
| 2011/0275402 A1* | 11/2011 | Charipadi | H04W 56/0035 |
| | | | 455/522 |
| 2011/0281571 A1* | 11/2011 | Patel | H04W 56/0015 |
| | | | 455/418 |
| 2011/0281574 A1* | 11/2011 | Patel | H04W 56/0015 |
| | | | 455/422.1 |
| 2012/0094652 A1* | 4/2012 | Kilgour | H04W 56/0035 |
| | | | 455/422.1 |
| 2012/0231790 A1 | 9/2012 | Lindoff et al. | |
| 2012/0294245 A1 | 11/2012 | Chang et al. | |
| 2013/0122917 A1* | 5/2013 | Yavuz | H04J 3/0638 |
| | | | 455/450 |
| 2013/0172036 A1 | 7/2013 | Miklos et al. | |
| 2013/0281080 A1* | 10/2013 | Carmon | H04L 27/0014 |
| | | | 455/422.1 |
| 2014/0105192 A1 | 4/2014 | Park et al. | |
| 2015/0131749 A1 | 5/2015 | Slomina et al. | |
| 2016/0081039 A1 | 3/2016 | Lindoff et al. | |

FOREIGN PATENT DOCUMENTS

| | | |
|---|---|---|
| WO | 2012082024 A1 | 6/2012 |
| WO | 2012087190 A1 | 6/2012 |
| WO | 2012158578 A1 | 11/2012 |
| WO | 2013005972 A1 | 1/2013 |
| WO | 2013036873 A2 | 3/2013 |
| WO | 2013100831 A1 | 7/2013 |

OTHER PUBLICATIONS

PCT Written Opinion, dated May 26, 2014, in connection with International Application No. PCT/EP2013/069340, all pages.

Ericsson et al., Synchronization Procedures and Signals for D2D Discovery and Communication, 3GPP TSG-RAN WG1 #74, R1-132911, Barcelona, Spain, Aug. 19-23, 2013, 14 pages.

Nokia et al., D2D Discovery Signal Considerations, 3GPP TSG-RAN WG1 Meeting #74, R1-133498, Barcelona, Spain, Aug. 19-23, 2013, 6 pages.

Interdigital, D2D Communications, 3GPP TSG-RAN WG1 Meeting #74, R1-133178, Barcelona, Spain, Aug. 19-23, 2013, 8 pages.

Yanxiang Jiang et al., Research of Synchronization and Training Sequence Design for Cooperative D2D Communications Underlaying Hyper-Cellular Networks, 2013 IEEE International Conference on Communications Workshops, Jun. 9, 2013, pp. 271-275.

PCT International Search Report, dated Jul. 3, 2014, in connection with International Application No. PCT/EP2013/069338, all pages.

PCT Written Opinion, dated Jul. 3, 2014, in connection with International Application No. PCT/EP2013/069338, all pages.

3GPP TSR-RAN1 Meeting #72, R1-120469, LTE device to device evaluation methodology, St. Julian's, Malta, Jan. 28-Feb. 1, 2013, 7 pages.

Non-Final Office Action dated Nov. 22, 2017 in connection with U.S. Appl. No. 14/917,055, 25 pages.

Korean Office Action, dated Sep. 15, 2017, in connection with Korean Application No. 10-2016-7009778, 3 pages.

English language translation of Korean Office Action, dated Sep. 15, 2017, in connection with Korean Application No. 10-2016-7009778, 2 pages.

European Communication dated Oct. 25, 2017, in connection with EP Application No. 13762859.0, 4 pages.

Notice of Allowance dated May 2, 2018 in connection with copending U.S. Appl. No. 14/917,055, 14 pages.

EP Communication, dated Nov. 30, 2018, in connection with European Application No. 17186723.7, 10 pages.

3GPP TSG-RAN WG1 Meeting #74, R1-133496, Barcelona, Spain, Aug. 19-23, 2013, Nokia, NSN, "D2D Synchronization—Out of network coverage-partial network coverage", 4 pages.

Notice of Allowance dated May 17, 2019 in connection with co-pending U.S. Appl. No. 16/052,191, 8 pages.

* cited by examiner

CELL SEARCH IN CLUSTERS

TECHNICAL FIELD

Embodiments presented herein relate to cluster based communications networks, and particularly to methods, devices, a computer programs, and computer program products for cell search in cluster based communications networks.

BACKGROUND

In mobile communication networks, there is always a challenge to obtain good performance and capacity for a given communications protocol, its parameters and the physical environment in which the mobile communication network is deployed.

In national security and public safety (NSPS) scenarios, there is a need to allow wireless devices (such as cellular user equipment, UE, modems, smartphones, sensors, tablet computer, machine type devices) to communicate directly with one another when they are under cellular network coverage. In 3GPP LTE networks (NW), this so called Device to Device communication (D2D) or Proximity Services (ProSe) is made possible by the "LTE Direct" technology that allows a cellular base station (BS or eNB) to set up a direct D2D link between two UEs and allocate resources for that link.

D2D communication exists in several versions today. Examples include Bluetooth, several variants of the IEEE 802.11 standards suite such as WiFi Direct, and Flashlinq. Recently, device-to-device communications as an underlay to cellular networks have been proposed as a means to take advantage of the proximity of communicating devices and at the same time to allow devices to operate in a controlled interference environment. An advantage with D2D under cellular a cellular NW control (network assisted D2D) is that optimized spectrum usage as well as low power discovery algorithms can be developed.

A technical mechanism that addresses D2D communication both in and outside NW coverage is based on clustering, where some of the devices (UEs) act as a Cluster Head (CH) device and other devices act as Slave devices. A CH device can be compared to a small range base station that, in the absence of a cellular eNB, provides (a subset of and) similar functionality as an eNB. For example, a CH device may provide synchronization and radio resource management within the cluster and may also act as a central node to create a tree topology for communication with the cluster. In addition, the CH device may also provide a relaying functionality towards other clusters or towards a cellular eNB.

In a cluster scenario, wireless devices within the cluster are required to do cell search on regular basis in order to be able to detect whether the wireless device has come into NW coverage again. Once a wireless devices (or the CH device itself) determines presence of a regular network node, the cluster has an operative connection to the core network (and Internet Protocol network) and more service may be able to be supported within the cluster.

In general terms, CH devices are low power nodes, often battery driven, and assumed to have lower cost compared to eNBs (or other regular NW nodes). Therefore, the CH devices will be made up by simpler components with lower performance compared to that of an eNB. One such component is the crystal oscillator (XO), which is used for generating reference timing and reference carrier frequency. Current NW nodes have a very accurate XO and are assumed always to be connected to a power supply (such as a regular power supply, solar power, a powerful battery backup, etc.). The requirement for the frequency accuracy for a NW node is 0.1 ppm, corresponding to a frequency error of less than 200 Hz at a carrier frequency of 2 GHz.

In current wireless devices (mobile phones, tablets, etc.) the XO accuracy is 10-15 ppm implying a frequency error of ±20-30 kHz at 2 GHz. Hence, once a wireless device at start up connects to a NW node, the wireless today needs need to not only to find a NW node (a cell) to camp on but also to find the correct carrier frequency and lock its interval frequency generation to a more accurate source than the internal XO of the wireless device. Known Cell Search (CS) algorithms aim for determination of specific synchronization signals transmitted from the NW nodes in order to determine timing, the exact carrier frequency, as well as the NW node cell ID. Synchronization signals (PSS/SSS in LTE, P-SCH/S-SCH in WCDMA) used for determining cells in current cellular systems like LTE and WCDMA/HSPA work with a frequency error of up to approximately 3-4 kHz. With this robustness of CS, a wireless device can perform CS using its own carrier frequency in connected mode (i.e. when in-sync with the NW), also for the highest reasonable Doppler shift. However, during initial CS, i.e. when a wireless device has not yet connected to any NW node, a frequency grid for the CS is needed with a 5-10 kHz carrier spacing in order to cope with the uncertainty of the XO.

CH devices may have XOs with accuracies closer to today's UEs than today's NW nodes, mainly due to cost and power consumption reasons. This means that the devices in the network need to operate with regular network nodes (such as eNBs) and low power network nodes (such as CH devices) that have different XO accuracy.

Hence, there is still a need for an improved cell search in heterogeneous communications networks, such as cluster based communications networks.

SUMMARY

An object of embodiments herein is to provide improved cell search in heterogeneous communications networks, such as cluster based communications networks.

CH devices in out-of-NW coverage scenarios act as a synchronization reference with respect to timing and carrier frequency within the cluster. That means that wireless devices in the cluster adjust their internal clocks (XO) to the clock of the CH device. However, since the CH clock reference may be rather inaccurate compared to the true reference (as provided by NW nodes), wireless devices operatively connected to the CH devices may experience significant frequency error (larger than 3-4 kHz) when performing a cell search for regular NW nodes. The inventors of the enclosed embodiments have through a combination of practical experimentation and theoretical derivation therefore realized that since the wireless device is operatively connected to a CH device it is by definition in-sync with the system and the controlling node (i.e., the CH device), and hence believes that the clock and corresponding carrier frequency is within acceptable range. For example, normally wireless devices in a cellular communications system can expect much less absolute frequency error in connected mode, such as maybe in the order of a few tens of Hz, and not as much as a few tens of kHz. Wireless devices connected to CH devices without an own network connection (which thus will have to rely on an inaccurate CH clock), will therefore have difficulties if using known cell search mechanisms for determining presence of of network nodes.

According to a first aspect there is presented a method for cell search in a cluster based communications network. The method is performed by a wireless device. The wireless device is camping on or served by a cluster head device associated with a cluster head carrier frequency $f_{CH}$. The method comprises acquiring frequency measurement configuration information from the cluster head device at a first reference frequency $f_1$, the first reference frequency using a system bandwidth. The method comprises performing a first cell search on a second reference frequency $f_2$, based on the frequency measurement configuration information. The method comprises, in a case no network node is found during the first cell search on the second reference frequency, performing a second cell search on a third reference frequency $f_3$, wherein the second reference frequency and the third reference frequency differ substantially less than the system bandwidth.

According to a second aspect there is presented a method for cell search in a cluster based communications network. The method is performed by a cluster head device. The cluster head device is associated with a cluster head carrier frequency $f_{CH}$. The method comprises determining an internal clock accuracy. The method comprises transmitting, based on the internal clock accuracy, frequency measurement configuration information to a wireless device camping on or served by the cluster head device.

Advantageously the methods of the first and second aspects solve, or at least mitigate, issues relating to large frequency errors during cell search of neighboring clusters and network nodes in scenarios of wireless devices being in a cluster operating out-of-network coverage and where the cluster is headed by a low power cluster head device.

According to a third aspect there is presented a wireless device for cell search in a cluster based communications network. The wireless device is arranged for camping on or being or served by a cluster head device. The cluster head device is associated with a cluster head carrier frequency $f_{CH}$. The wireless device comprises a processing unit. The processing unit is arranged to acquire frequency measurement configuration information from the cluster head device at a first reference frequency $f_1$, the first reference frequency using a system bandwidth. The processing unit is arranged to perform a first cell search on a second reference frequency $f_2$, based on the frequency measurement configuration information. The processing unit is arranged to, in a case no network node is found during the first cell search on the second reference frequency, perform a second cell search on a third reference frequency $f_3$, wherein the second reference frequency and the third reference frequency differ substantially less than the system bandwidth.

According to a fourth aspect there is presented a cluster head device for cell search in a cluster based communications network. The cluster head device is associated with a cluster head carrier frequency $f_{CH}$. The cluster head device comprises a processing unit. The processing unit is arranged to determine an internal clock accuracy. The cluster head device comprises a transmitter. The transmitter is arranged to transmit, based on the internal clock accuracy, frequency measurement configuration information to a wireless device camping on or served by the cluster head device.

According to a fifth aspect there is presented a computer program for cell search in a cluster based communications network, the computer program comprising computer program code which, when run on a wireless device, causes the wireless device to perform a method according to the first aspect.

According to a sixth aspect there is presented a computer program for cell search in a cluster based communications network, the computer program comprising computer program code which, when run on a cluster head device, causes the cluster head device to perform a method according to the second aspect.

According to a seventh aspect there is presented a computer program product comprising a computer program according to at least one of the fifth and sixth aspect, respectively, and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any feature or step indicated by dashed lines should be regarded as optional.

Figure 1:
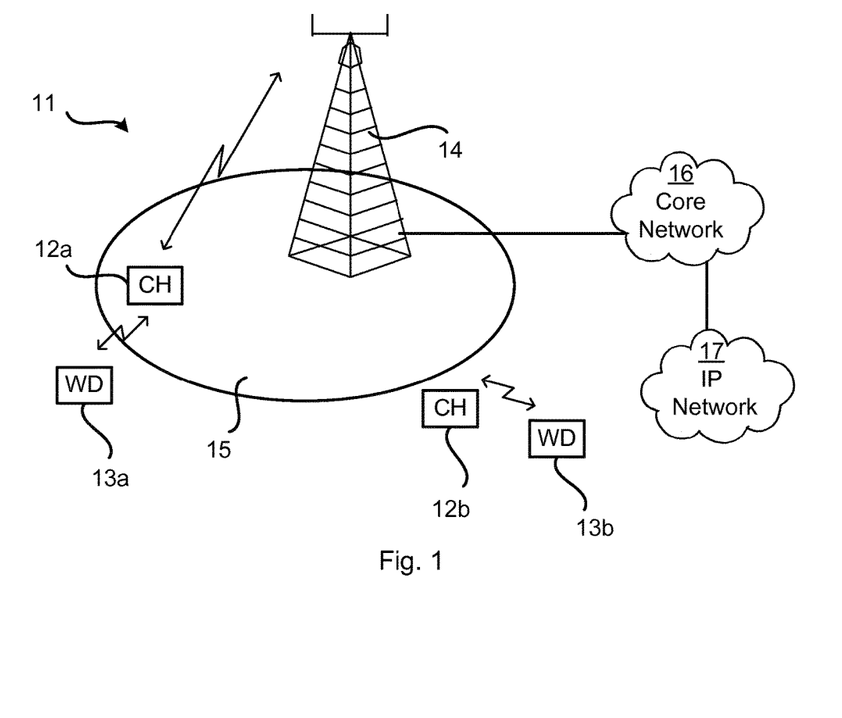
FIG. 1 is a schematic diagram illustrating a cellular communication network according to embodiments.

FIG. 1 shows a schematic overview of an exemplifying cellular communication network 11. The cellular communication network 11 comprises a network node (NN) 14 providing network coverage over a cell 15. A cell 15 is served by at least one of network node 14. A wireless device (WD) positioned in a particular cell is thus provided network service by the network node 14 serving that particular cell 15. Further, the network node 14 is arranged to communicate with other network nodes (not shown) via communications links. The network node 14 is also operatively connected to a core network 16. The core network 16 may provide services and data to the WD operatively connected to at least one network node 14 from an external packet switched Internet Protocol (IP) data network 17. The cellular communications network 11 may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, HSPA (High Speed Packet Access), etc., as long as the principles described hereinafter are applicable.

One situation that could arise is that one or more of the WDs (such as WDs 13a, 13b) are outside the coverage area 15 of the network node 14, or that there is a failure of the network node 14 or that the maximum cell load limit of a network node 14 is reached. In order for a WD 13a, 13b not able to establish a direct communications link to a network node 14 to access services and data of the IP data network 17, or for a WD 13a, 13b to engage in local communications with UEs that are in its proximity (for this or any other purpose), clustering mechanisms may be deployed in the communications network 1a. By means of the clustering mechanisms an ad hoc network may thus be formed. Such mixed cellular and ad hoc networks provide a natural solution to providing communication services with partial infrastructure coverage or even in geographical areas without any cellular network coverage due to lack of infrastructure or due to natural disaster, public safety or failure situations. The cellular communication network 11 therefore further comprises cluster head (CH) devices 12a, 12b. The CH devices 12a, 12b may be regarded as low power nodes. Physically, the CH devices 12a, 12b may be of the same type as the WDs 13a, 13b. The CH devices 12a, 12b are arranged to serve as a low power network node. The term CH device is thus used herein to distinguish the role a device, such as a UE, takes in a cluster context. The CH devices 12a, 12b may in other aspects be identical to the wireless devices 13a, 13b. As the skilled person understands, the cellular communications network 11 may comprise a plurality of network nodes 14 and a plurality of WDs 13a, 13b and CH devices 12a, 12b operatively connected to at least one of the plurality of network nodes 14.

In the cellular communication network 11 it is assumed that the network node 14 is power supplied (regular power supply, solar power, battery backup etc.) and is using high cost components. Hence its crystal oscillator (XO) is assumed to be very accurate is and therefore also assumed to transmit with a correct carrier frequency, $f_c=f_o$. Two different clusters are shown in FIG. 1; a first cluster comprises wireless device 13a operatively connected to cluster head device 12a, and a second cluster comprises wireless device 13b operatively connected to cluster head device 12b.

For the first cluster the cluster head device 12b is within the coverage of the network node 14 (as defined by the cell 15). In this case, the network node 14 serves as the reference clock (and as the carrier frequency reference), and the cluster head device 12a serving the wireless device 13a outside of the network coverage may thus be in synchronization with the network node 14 via the cluster head device 12a. The wireless device 13a is therefore assumed to transmit on the correct carrier frequency $f_o$. Hence wireless devices outside network coverage may perform intra frequency cell search in connected mode as is known in the art.

For the second cluster, both the wireless device 13b and the cluster head device 12b are outside the coverage of the network node 14 (as defined by the cell 15). In this case the cluster head device 12b serves as the clock reference. However, due to an inaccurate XO in the cluster head device 12b (as compared to the XO of the network node 14) there may be a large frequency error in the carrier frequency, i.e. $f_c=f_o+\Delta$. In this case, the wireless devices served by the cluster head device 12b may, as will be further disclosed with references to the enclosed embodiments, configured with information about possible frequency error, due to the inaccurate clock in the cluster head device 12b. As will be further disclosed with references to the enclosed embodiments the wireless devices may then perform a cell search on a frequency grid around $f_o$.

The embodiments disclosed herein thus relate to cell search in a cluster based communications network 11. In order to obtain cell search in a cluster based communications network 11 there is provided a wireless device 13a, 13b a method performed by the wireless device 13a, 13b, a computer program comprising code, for example in the form of a computer program product, that when run on a wireless device 13a, 13b, causes the wireless device 13a, 13b to perform the method. In order to obtain cell search in a cluster based communications network 11 there is also provided a cluster head device 12a, 12b a method performed by the cluster head device 12a, 12b, a computer program comprising code, for example in the form of a computer program product, that when run on a cluster head device 12a, 12b, causes the cluster head device 12a, 12b to perform the method.

Figure 2A:
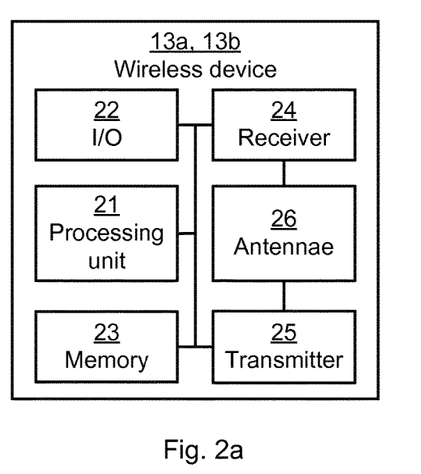
FIG. 2a is a schematic diagram showing functional modules of a wireless device according to an embodiment.

FIG. 2a schematically illustrates, in terms of a number of functional modules, the components of a wireless device 13a, 13b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a memory 23. Thus the processing unit 21 is thereby arranged to execute methods as herein disclosed. The memory 23 may also comprise persistent storage, which, for example, can be any single one or combination of magnetic memory, optical memory, solid state memory or even remotely mounted memory. The wireless device 13a, 13b may further comprise an input/output (I/O) interface 22 for receiving and providing information to a user interface. The wireless device 13a, 13b also comprises one or more transmitters 25 and receivers 24, comprising analogue and digital components and a suitable number of antennae 26 for radio communication with a network node 14, a cluster head device 12a, 12b, or another wireless device 13b. The processing unit 21 controls the general operation of the wireless device 13a, 13b, e.g. by sending control signals to the transmitter 25 and/or receiver 24 and receiving reports from the transmitter $2_5$ and/or receiver 24 of its operation. Other components, as well as the related functionality, of the wireless device 13a, 13b are omitted in order not to obscure the concepts presented herein.

Figure 2B:
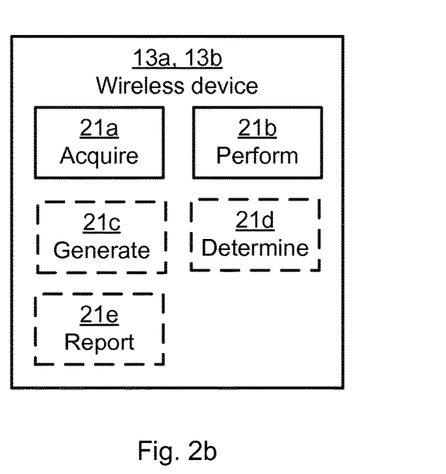
FIG. 2b is a schematic diagram showing functional units of a wireless device according to an embodiment.

FIG. 2b schematically illustrates, in terms of a number of functional units, the components of a wireless device 13a, 13b according to an embodiment. The wireless device 13a, 13b of FIG. 3 comprises a number of functional units; an acquiring unit 21a and a performing unit 21b. The wireless device 13a, 13b of FIG. 2b may further comprises a number of optional functional units, such as any of a generating unit 21c, a determining unit 21d, and a reporting unit 21e. The functionality of each functional unit 21a-e will be further disclosed below in the context of which the functional units may be used. In general terms, each functional unit 21a-e may be implemented in hardware or in software. The processing unit 21 may thus be arranged to from the memory 23 fetch instructions as provided by a functional unit 21a-e and to execute these instructions, thereby performing any steps as will be disclosed hereinafter.

Figure 3A:
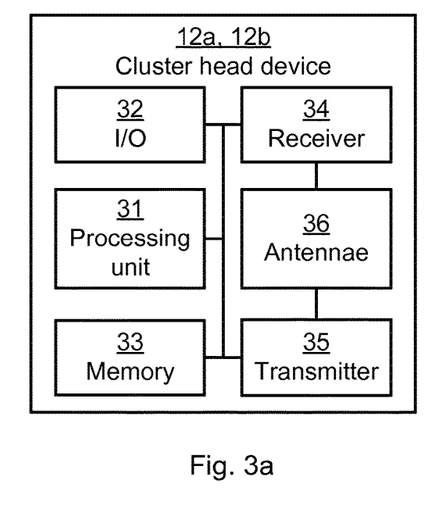
FIG. 3a is a schematic diagram showing functional modules of a cluster head device according to an embodiment.

FIG. 3a schematically illustrates, in terms of a number of functional modules, the components of a cluster head device 12a, 12b according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a memory 33. Thus the processing unit 31 is thereby arranged to execute methods as herein disclosed. The memory 33 may also comprise persistent storage, which, for example, can be any single one or combination of magnetic memory, optical memory, solid state memory or even remotely mounted memory. The cluster head device 12a, 12b may further comprise an input/output (I/O) interface 32 for receiving and providing information to a user interface. The cluster head device 12a, 12b also comprises one or more transmitters 35 and receivers 34, comprising analogue and digital components and a suitable number of antennae 36 for radio communication with a network node 14, a wireless device 12a, 12b, or another cluster head device 13b. The processing unit 31 controls the general operation of the cluster head device 13a, 13b, e.g. by sending control signals to the transmitter 35 and/or receiver 34 and receiving reports from the transmitter 35 and/or receiver 34 of its operation. Other components, as well as the related functionality, of the cluster head device 12a, 12b are omitted in order not to obscure the concepts presented herein.

Figure 3B:
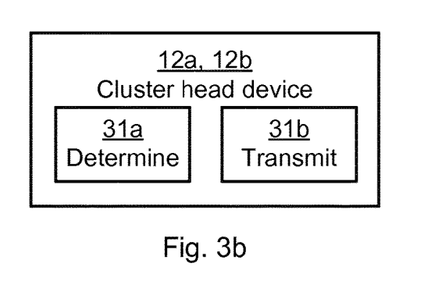
FIG. 3b is a schematic diagram showing functional units of a cluster head device according to an embodiment.

FIG. 3b schematically illustrates, in terms of a number of functional units, the components of a cluster head device 12a, 12b according to an embodiment. The cluster head device 12a, 12b of FIG. 3b comprises a number of functional units; a determining unit 31a and a transmitting unit 31b. The functionality of each functional unit 31a-b will be further disclosed below in the context of which the functional units may be used. In general terms, each functional unit 31a-b may be implemented in hardware or in software. The processing unit 31 may thus be arranged to from the memory 33 fetch instructions as provided by a functional unit 31a-b and to execute these instructions, thereby performing any steps as will be disclosed hereinafter.

Figure 4:
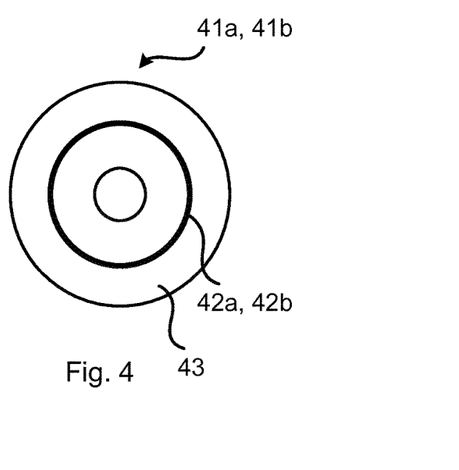
FIG. 4 shows one example of a computer program product comprising computer readable means according to an embodiment.
Figure 6:
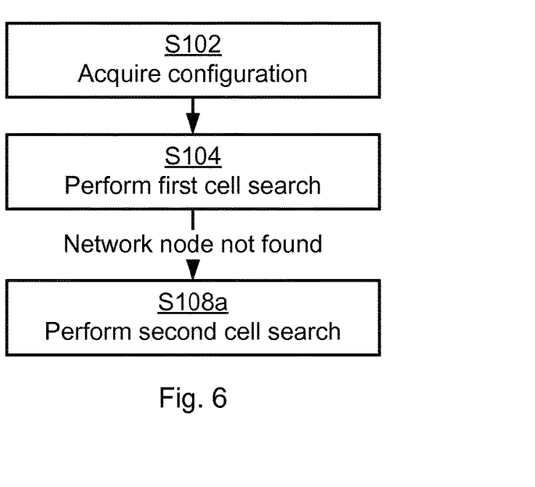
FIGS. 6, 7, 8, and 9 are flowcharts of methods according to embodiments.
Figure 7:
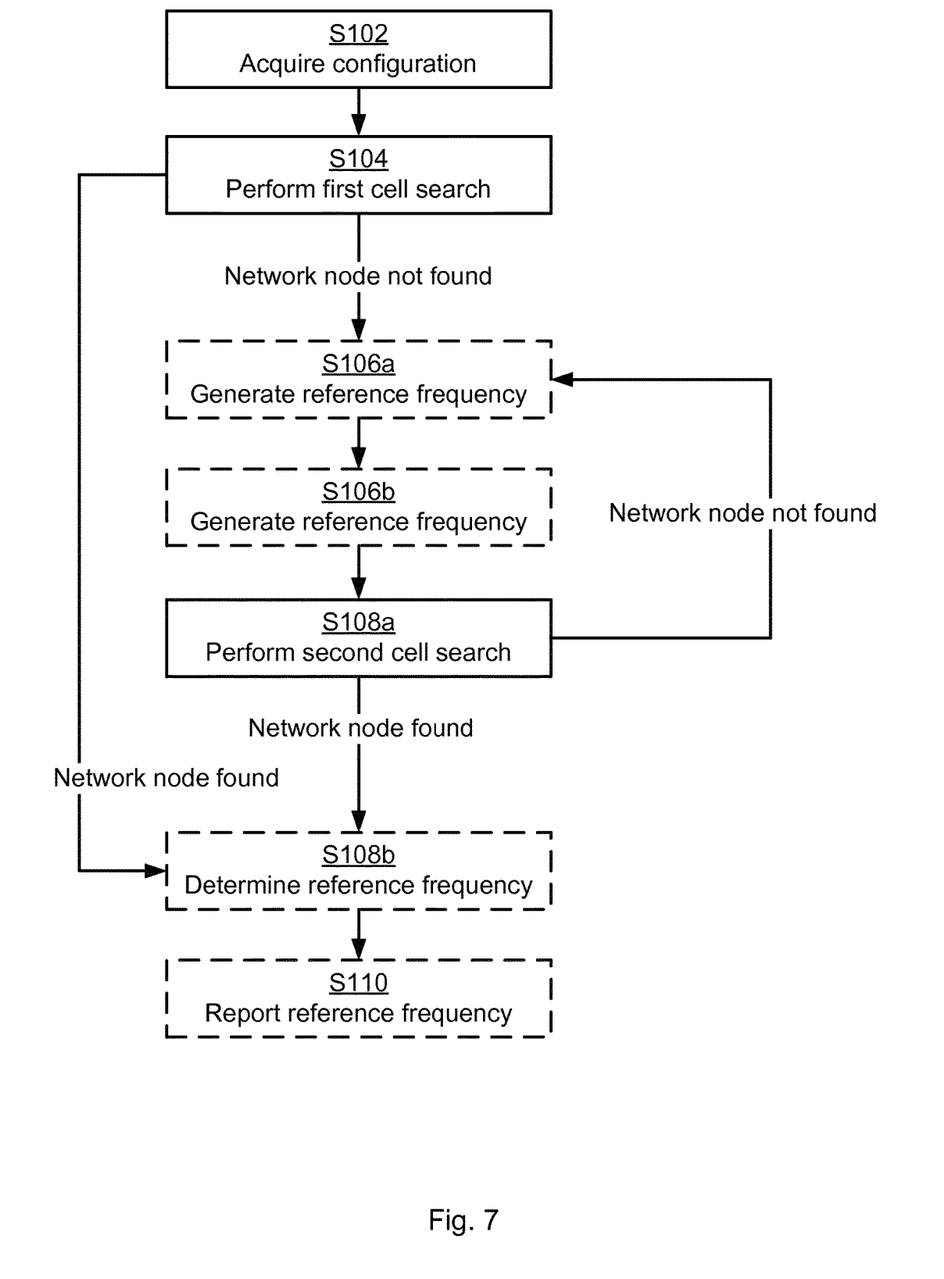
Figure 8:
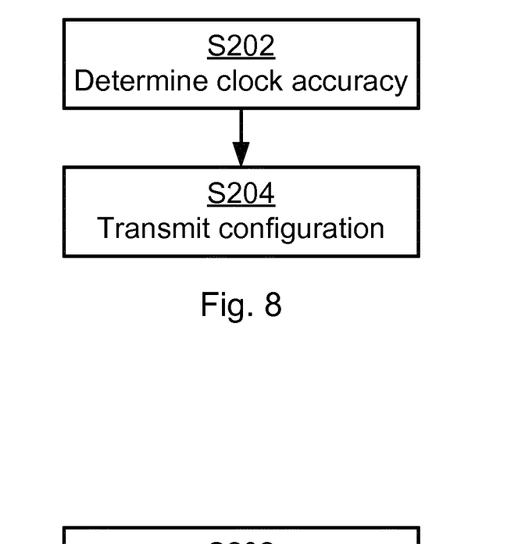
Figure 9:
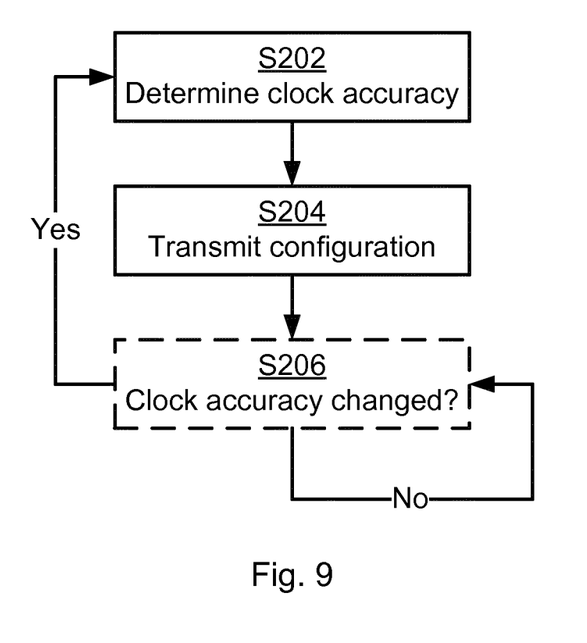

FIGS. 6 and 7 are flow charts illustrating embodiments of methods for cell search in a cluster based communications network as performed by a wireless device 13a, 13b. FIGS. 8 and 9 are flow charts illustrating embodiments of methods for cell search in a cluster based communications network as performed by a cluster head device 12a, 12b. The methods are advantageously provided as computer programs 42a, 42b. FIG. 4 shows one example of a computer program product 41a, 41b comprising computer readable means 43. On this computer readable means 43, at least one computer program 42a, 42b can be stored, which at least one computer program 42a, 42b can cause the processing units 21, 31 and thereto operatively coupled entities and devices, such as the memories 23, 33, the I/O interfaces 22, 32, the transmitters 25, 35, the receivers 24, 34 and/or the antennae 26, 36 to execute methods according to embodiments described herein. The computer program 42a, 42b and/or computer program product 41a, 42b may thus provide means for performing any steps as herein disclosed.

In the example of FIG. 4, the at least one computer program product 41a, 41b is illustrated as an optical disc, such as a CD (compact disc) or a DVD (digital versatile disc) or a Blu-Ray disc. The at least one computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 42a, 42b is here schematically shown as a track on the depicted optical disk, the at least one computer program 42a, 42b can be stored in any way which is suitable for the computer program product 41a, 41b.

First Overall Embodiment; Wireless Device

Reference is now made to FIG. 1 and FIG. 6. A method for cell search in a cluster based communications network 11 as performed by a wireless device 13b camping on or served by a cluster head device 12b associated with a cluster head carrier frequency $f_{CH}$ will now be disclosed. An idle wireless device is camping on a cluster head device (and hence is known by the cluster head device 12b, but has no active connection to the cluster head device 12b), whilst an active wireless device is served by a cluster head device (and thus has an active connection). Whether camping on or being served by a cluster head device, the wireless device receives a downlink (DL) carrier on a first reference carrier. The reference carrier frequency of the wireless device may coincide with the carrier frequency of the cluster head device, but may differ somewhat due to Doppler shift and/or remaining frequency error. Hence the status of the wireless device with respect to the cluster head device is in-sync. The wireless device receives an intra-frequency measurement configuration message for the cluster head device. Particularly, the processing unit 21 of the wireless device 13b is arranged to, in a step S102, acquire frequency measurement configuration information. The acquiring may be performed by executing functionality of the acquiring unit 21a. The computer program 42a and/or computer program product 41a may thus provide means for this acquiring. The frequency measurement configuration information is acquired from the cluster head device 12b at a first reference frequency $f_1$. The first reference frequency uses a system bandwidth. The system bandwidth is the bandwidth allowed to be used by the communications system facilitating the communications between the wireless device 13b and the cluster head device 12b.

Then the wireless device 13b, on regular basis (for instance determined from configuration message, or hard coded defined by the communications standard used, or so often that standard requirements (or requirement associated with the received configuration message) are fulfilled), performs a cell search and scans a second reference frequency for potential network nodes 14. Particularly, the processing unit 21 of the wireless device 13b is arranged to, in a step S104, perform a first cell search. The first cell search may be performed by executing functionality of the performing unit 21b. The computer program 42a and/or computer program product 41a may thus provide means for this performing 21b. The first cell search, which is based on the frequency measurement configuration information, is performed on a second reference frequency $f_2$.

Figure 5:
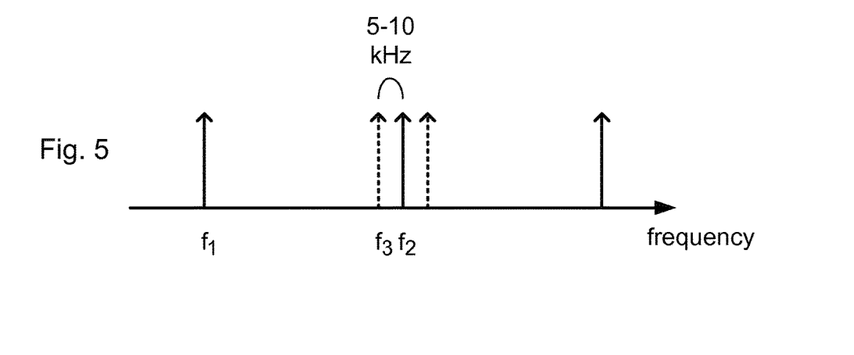
FIG. 5 schematically illustrates reference frequencies.

It could be that no network node 14 is found during the first cell search on the second reference frequency. In this case a second cell search is performed. Thus, if no cells are determined on the second reference frequency, the wireless device 13b also scans at least a third reference frequency for a network node 14. Particularly, the processing unit 21 of the wireless device 13b is arranged to, in a step S108a, and in a case no network node 14 is found during the first cell search on the second reference frequency, perform a second cell search. The second cell search may be performed by executing functionality of the performing unit 21b. The computer program 42a and/or computer program product 41a may thus provide means for this performing 21b. The second cell search is performed on a third reference frequency $f_3$. The second reference frequency $f_2$ and the third reference frequency $f_3$ differ substantially less than the system bandwidth. One reason for this difference to be substantially smaller than the system bandwidth is that the wireless device 13b may have knowledge of the possible uncertainty of the carrier frequency of the cluster head device 12b. FIG. 5 schematically illustrates possible locations of the first reference frequency $f_1$, the second reference frequency $f_2$, and the third reference frequency $f_3$.

Reference is now made to FIG. 1 and FIG. 7. Embodiments relating to further details of cell search in a cluster based communications network 11 as performed by a wireless device 13b will now be disclosed.

The frequency measurement configuration information may comprise information related to clock accuracy for the cluster head device 12b. The clock accuracy may be explicitly stated (for example, in ppm). Alternatively, the frequency measurement configuration information may indicate an accuracy mode. For example, the accuracy mode may indicate that the cluster head device 12b has a clock accuracy of a network node; that there are small uncertainties in the accuracy (say, some few kHz), or that there is a large uncertainty in the accuracy (say, in the order of 20 kHz or so). The wireless device 13b then based on the information determines whether known cell search and measurement can be performed or if an extended cell search approach as disclosed above need to be carried out. If, say, the configuration message indicates an uncertainty over, say, some 3-4 kHz, the processing unit 21 of the wireless device 13b may determine that an extended cell search is needed.

There may be different ways to select the reference frequencies disclosed above. Different embodiments relating thereto will now be described in turn. According to an embodiment the first reference frequency is substantially the same as the cluster head carrier frequency. According to an embodiment the first reference frequency is identical to the second reference frequency. According to an embodiment a difference between the second reference frequency and the third reference frequency is less than a sub-carrier distance, for example the distance between two sub carriers in an OFDM (orthogonal frequency-division multiplexing) system. Depending on the configuration message, the wireless device 13b may scan one or more second reference frequencies. The second reference frequency thus differs from the first reference frequency significantly smaller than the system bandwidth, preferably in the order of 5-10 kHz. According to an embodiment the processing unit 21 of the wireless device 13b is arranged to, in an optional step, continue the cell search by repeating the step of performing the second cell search at $f_{3,n}=f_3 \pm n \cdot f_{SC}$ kHz, for n=1, 2, . . . , $N_{max}$, where $f_{SC}$ is the order of a sub-carrier bandwidth. Preferably $f_{CS}$=7.5 kHz, and/or preferably $N_{max}=5 \cdot N_{max}$ may also depend on the carrier frequency; the higher carrier frequency the larger absolute uncertainty and hence larger frequency range need to be spanned (i.e., a larger $N_{max}$).

There may be different ways to generate the third reference frequency. According to a first embodiment the processing unit 21 of the wireless device 13b is arranged to, in an optional step S106a generate the third reference frequency from the second reference frequency by adjusting a local oscillator of the wireless device. The generating may be performed by executing functionality of the generating unit 21c. The computer program 42a and/or computer program product 41a may thus provide means for this generating 21c. In some embodiments, the local oscillator of the wireless device 13b is thus adjusted; hence an analog adjustment approach may be used. According to a second embodiment the processing unit 21 of the wireless device 13b is arranged to, in an optional step S106b generate the third reference frequency from the second reference frequency by transforming, through digital mixing, the received frequency measurement configuration information at baseband to a carrier corresponding to the third reference frequency. The generating may be performed by executing functionality of the generating unit 21c. The computer program 42a and/or computer program product 41a may thus provide means for this generating 21d. In some embodiments, the wireless device 13b may thus perform digital mixing to transform the received baseband signal to a carrier corresponding to the third reference frequency.

As noted above, the wireless device 13b performs a second cell search in a case no network node 14 is found during the first cell search on the second reference frequency. In general terms, the processing unit 21 of the wireless device 13b is arranged to determine whether a cell is detected or not. The determining may be performed by executing functionality of the determining unit 21d. The computer program 42a and/or computer program product 41a may thus provide means for this determining 21d. If a cell 15 (i.e., by signalling from a network node 14) is detected, the wireless device 13b may optionally determines the exact carrier frequency of the network node 14. Particularly, according to an embodiment the processing unit 21 of the wireless device 13b is arranged to, in an optional step S108b, and in a case a network node 14 is found during the first or second cell search, determine the reference frequency of the network node 14 from signals (for example, but not limited to, synchronization signals (such as primary and secondary synchronization signals, PSS/SSS, in LTE) as well as other pilot or reference signals (such as cell-specific reference signals, CRS, in LTE)) received from the network node 14. The determining may be performed by executing functionality of the determining unit 21d. The computer program 42a and/or computer program product 41a may thus provide means for this determining 21d. This may be accomplished by estimating the frequency error relative the first reference frequency. synchronization signals (such as primary and secondary synchronization signals, PSS/SSS, in LTE) as well as other pilot or reference signals (such as cell-specific reference signals, CRS, in LTE). This may also involve the wireless device 13b using an automatic frequency control tracking algorithm.

The wireless device 13b may then optionally determine the frequency difference and may optionally also report the difference to the cluster head device 12b. The cluster head device 12b may then use this information for adjusting its own internal clock. According to an embodiment the transmitter 25 of the wireless device 13b is arranged to, in an optional step S110, report the reference frequency of the network node 14 to the cluster head device 12b. The reporting may be performed by executing functionality of the reporting unit 21e. The computer program 42a and/or computer program product 41a may thus provide means for this reporting 21e.

Second Overall Embodiment; Cluster Head Device

Reference is now made to FIG. 1 and FIG. 8. A method for cell search in a cluster based communications network 11 as performed by a cluster head device 12b associated with a cluster head carrier frequency $f_{CH}$ will now be disclosed. First the cluster head device 12b determines its internal clock accuracy (and hence also the carrier frequency accuracy). The processing unit 31 of the cluster head device 12b is thus arranged to, in a step S202, determine an internal clock accuracy. The determining may be performed by executing functionality of the determining unit 31a. The computer program 42b and/or computer program product 41b may thus provide means for this determining 31a.

The internal clock accuracy is used as a basis for transmitting frequency measurement configuration information. Based on the determined clock accuracy the cluster head device 12b transmits a configuration message to wireless devices 13b camping on or served by the cluster head device 12b. Particularly, the processing unit 31 of the cluster head device 12b is arranged to, in a step S204, transmit frequency measurement configuration information to a wireless device 13b camping on or served by the cluster head device 12b. The transmitting may be performed by executing functionality of the transmitting unit 31b. The computer program 42b and/or computer program product 41b may thus provide means for this transmitting 31b. The transmitted frequency measurement configuration information is based on the internal clock accuracy.

Reference is now made to FIG. 1 and FIG. 9. Embodiments relating to further details of cell search in a cluster based communications network 11 as performed by a cluster head device 12b will now be disclosed.

There may be different ways to determine the internal clock accuracy. Different embodiments relating thereto will now be described in turn.

The XO accuracy may be different depending on the temperature of a part of a chip (or XO) included in the cluster head device 12b. The cluster head device 12b may thus determine the clock accuracy based on, for instance, readings from temperature sensor and by performing table look-up.

In another example a timer may be used, where the timer is related to the time the cluster head device 12b last time was operatively connected to (i.e., served by or camping on) a network node 14 with a high accuracy clock. This is due to that there typically is a slow drift in accuracy in the XO, hence the cluster head device 12b may be slowly drifting away from its reference timing/frequency.

Yet another example is that, in case the cluster head device 12b is connected to another low power node, such as another cluster head device 12a, the number of (low power) nodes or wireless device away from a high accuracy network node 14 the cluster head device 12b is. This example may assume that the clock slowly diverges with the number of low accuracy nodes to a network node 14.

In yet another example the internal clock is assumed to have a certain manufacturing accuracy, for instance 10 ppm.

That is, according to embodiments the internal clock accuracy is determined from a temperature of a part of the cluster head device 12b, from a duration in time from the most previous connection to a network node 14, from a connection to another cluster head device 12a, from a manufacturing accuracy, or any combination thereof. The determining may be performed by executing functionality of the determining unit 31a. The computer program 42b and/or computer program product 41b may thus provide means for this determining 31a.

The frequency measurement configuration information may comprise further information. Different embodiments relating thereto will now be described in turn.

For example, the configuration message may comprise at least information about the current carrier frequency (or timing) accuracy for the cluster head device 12b. That is, according to an embodiment the frequency measurement configuration information comprises at least one of a current carrier frequency accuracy of the cluster head device, and current timing accuracy of the cluster head device.

For example, the configuration message may additionally or alternatively further comprise intra-frequency or inter-frequency cell search and mobility measurement policies, for instance requirements on how often cell search or measurements need to be carried out. That is, according to an embodiment the frequency measurement configuration information comprises intra-frequency cell search or inter-frequency cell search, and mobility measurement policies.

The cluster head device 12b may then monitor its internal clock accuracy. According to an embodiment the processing unit 31 of the cluster head device 12b is arranged to, in an optional step S206 monitor changes of the clock accuracy. Once the accuracy has been cluster head device 12b it may transmit a new configuration message to the operatively connected wireless devices, as in step S202 above.

In summary there has been presented embodiments relating to cell search in a cluster based communications network 11.

In a first overall embodiment (as illustrated in FIGS. 6 and 7), a wireless device operatively connected to a cluster head device has been disclosed. The wireless device receives a configuration message, and determines the cell search approach to use, based on the configuration message information. In an embodiment, the wireless device performs intra frequency cell search on a second reference frequency and if no cell found was found a cell search is performed on at least a third reference frequency. The difference between the second and third reference frequencies is significantly smaller than the system bandwidth.

In a second overall embodiment (as illustrated in FIGS. 8 and 9), a cluster head device transmits a configuration message to its operatively connected wireless devices. The configuration message may comprise information about the current carrier frequency (or timing) accuracy for the cluster head device. The configuration message may also include intra- and/or inter-frequency cell search and mobility measurement policies. Furthermore, the cluster head device may be a cluster head controlling a cluster.

However, as is readily appreciated by a person skilled in the art, other embodiments than the ones disclosed above are equally possible within the scope of the inventive concept, as defined by the appended patent claims.

For example, the wireless device may be scanning not only for network nodes 14, but also for other cluster head devices outside network coverage. Then the total possible frequency error may be even larger, and hence a larger frequency grid may need to be scanned (i.e. a larger number of third reference frequencies).

For example, the cluster may operate on another carrier frequency than the network node carrier frequency, and where the difference between these two frequencies is larger than the system bandwidth. Also in such cases, once the wireless device is configured to perform cell search on a set of reference frequencies based on its first reference frequency that may differ compared to the nominal "true" (from the network node perspective) reference frequency.

The skilled person further understands that, although the disclosed subject matter is described in a LTE context and the clusters have been described in a NSPS scenario, the enclosed embodiments are neither limited to LTE, nor to cluster head devices being the type of wireless devices as described above. The enclosed embodiments cover any kind of low power network node controlling other nodes or devices, with some inaccurate clock reference compared to another (network) node having better clock (and carrier frequency) accuracy.

The invention claimed is:

1. A method for cell search in a cluster based communications network, the method being performed by a wireless device camping on or served by a cluster head device associated with a cluster head carrier frequency, the method comprising:
   acquiring frequency measurement configuration information from the cluster head device at a first reference frequency, the first reference frequency using a system bandwidth;
   performing a first cell search on a second reference frequency, based on the frequency measurement configuration information; and
   in a case no network node is found during the first cell search on the second reference frequency:
      a processing unit of the wireless device controlling one or more wireless device components including a receiver to perform a second cell search on a third reference frequency, wherein a difference between the second reference frequency and the third reference frequency is less than the system bandwidth.

2. The method according to claim 1, wherein the cell search is continued by repeating the step of performing the second cell search at f3,n=f3±n·fSC kHz, for n=1, 2, . . . , Nmax, where fSC is the order of a sub-carrier bandwidth, preferably 5-10 kHz, and preferably Nmax=5.

3. The method according to claim 1, wherein the first reference frequency is substantially the same as the cluster head carrier frequency.

4. The method according to claim 1, wherein the first reference frequency is identical to the second reference frequency.

5. The method according to claim 1, wherein a difference between the second reference frequency and the third reference frequency is less than a sub-carrier distance.

6. The method according to claim 1, further comprising:
   generating the third reference frequency from the second reference frequency by adjusting the local oscillator of the wireless device.

7. The method according to claim 1, further comprising:
   generating the third reference frequency from the second reference frequency by transforming, through digital mixing, the received frequency measurement configuration information at baseband to a carrier corresponding to the third reference frequency.

8. The method according to claim 1, further comprising, in a case a network node is found during the first or second cell search:
   determining a reference frequency of the network node from signals received from the network node.

9. The method according to claim 8, further comprising:
   reporting the reference frequency of the network node to the cluster head device.

10. A wireless device for cell search in a cluster based communications network, the wireless device being arranged for camping on or being served by a cluster head device associated with a cluster head carrier frequency, the wireless device comprising:
    a receiver; and
    a processing unit arranged to use the receiver to acquire frequency measurement configuration information from the cluster head device at a first reference frequency, the first reference frequency using a system bandwidth;
    the processing unit being arranged to perform a first cell search on a second reference frequency, based on the frequency measurement configuration information; and
    in a case no network node is found during the first cell search on the second reference frequency:
       the processing unit being arranged to control one or more wireless device components including the receiver to perform a second cell search on a third reference frequency, wherein a difference between the second reference frequency and the third reference frequency is less than the system bandwidth.

11. The wireless device according to claim 10, wherein the processing unit is arranged to:
    continue the cell search by repeating the step of performing the second cell search at f3,n=f3±n·fSC kHz, for n=1, 2, . . . , Nmax, where fSC is the order of a sub-carrier bandwidth, preferably fCS=5-10 kHz, and preferably Nmax=5.

12. The wireless device according to claim 10, wherein the processing unit is arranged to:
    generate the third reference frequency from the second reference frequency by adjusting a local oscillator of the wireless device.

13. The wireless device according to claim 10, wherein the processing unit is arranged to:
    generate the third reference frequency from the second reference frequency by transforming, through digital mixing, the received frequency measurement configuration information at baseband to a carrier corresponding to the third reference frequency.

14. The wireless device according to claim 10, wherein the processing unit is arranged to, in a case a network node is found during the first or second cell search:
    determine a reference frequency of the network node from signals received from the network node.

15. The wireless device according to claim 14, further comprising:
    a transmitter arranged to report the reference frequency of the network node to the cluster head device.

16. A nontransitory computer-readable storage medium comprising a computer program for cell search in a cluster based communications network, the computer program comprising computer program code which, when run on a wireless device camping on or served by a cluster head device associated with a cluster head carrier frequency, causes the wireless device to:

acquire frequency measurement configuration information from the cluster head device at a first reference frequency, the first reference frequency using a system bandwidth;

perform a first cell search on a second reference frequency, based on the frequency measurement configuration information; and in a case no network node is found during the first cell search on the second reference frequency:

control one or more wireless device components including a receiver to perform a second cell search on a third reference frequency, wherein a difference between the second reference frequency and the third reference frequency is less than the system bandwidth.

* * * * *